United States Patent
Placko et al.

(10) Patent No.: US 12,067,334 B2
(45) Date of Patent: Aug. 20, 2024

(54) METHOD FOR SIMULATING A FLOW IN WHICH A STRUCTURE IS SUBMERGED

(71) Applicants: CENTRE NATIONAL DE LA RECHERCHE SCIENTIFIQUE, Paris (FR); ECOLE NORMALE SUPERIEURE PARIS-SACLAY, Cachan (FR); FLIGHT TRAINING SOLUTIONS CONSULTING, Noisy le Grand (FR)

(72) Inventors: Dominique Placko, Creteil (FR); Jean-Pierre Barbot, Issy les Moulineaux (FR); Serge Gourlaouen, Noisy le Grand (FR); Alain Rivollet, Jouy en Josas (FR)

(73) Assignees: CENTRE NATIONAL DE LA RECHERCHE SCIENTIFIQUE, Paris (FR); ECOLE NORMALE SUPERIEURE PARIS-SACLAY, Cachan (FR); FLIGHT TRAINING SOLUTIONS CONSULTING, Noisy le Grand (FR)

( * ) Notice: Subject to any disclaimer, the term of this patent is extended or adjusted under 35 U.S.C. 154(b) by 742 days.

(21) Appl. No.: 17/266,931

(22) PCT Filed: Aug. 8, 2019

(86) PCT No.: PCT/EP2019/071286
§ 371 (c)(1),
(2) Date: Feb. 8, 2021

(87) PCT Pub. No.: WO2020/030727
PCT Pub. Date: Feb. 13, 2020

(65) Prior Publication Data
US 2021/0312112 A1    Oct. 7, 2021

(30) Foreign Application Priority Data

Aug. 10, 2018   (FR) ..................................... 1857440

(51) Int. Cl.
*G06F 30/28* (2020.01)
*G06F 17/16* (2006.01)
(Continued)

(52) U.S. Cl.
CPC .............. *G06F 30/28* (2020.01); *G06F 17/16* (2013.01); *G06F 2111/10* (2020.01); *G06F 2113/08* (2020.01)

(58) Field of Classification Search
CPC ...... G06F 30/28; G06F 17/16; G06F 2111/10; G06F 2113/08; G06F 30/20; G06F 30/15
See application file for complete search history.

(56) References Cited

U.S. PATENT DOCUMENTS

| 10,684,190 B2 | 6/2020 | Placko et al. |
| 2012/0065947 A1* | 3/2012 | Yu ........................... G06F 30/23 703/2 |

(Continued)

OTHER PUBLICATIONS

Mittal, Rajat, and Gianluca Iaccarino. "Immersed boundary methods." Annu. Rev. Fluid Mech. 37 (2005): 239-261. (Year: 2005).*

(Continued)

*Primary Examiner* — Eunhee Kim
(74) *Attorney, Agent, or Firm* — Greer, Burns & Crain, Ltd

(57) ABSTRACT

A method for simulating a flow in which a structure is submerged, the method being implemented by computer, and the behavior of the structure in the flow being modeled by radial and rotational sources generating a velocity field representing the flow around the structure.

17 Claims, 8 Drawing Sheets

(51) Int. Cl.
*G06F 111/10* (2020.01)
*G06F 113/08* (2020.01)

(56) References Cited

U.S. PATENT DOCUMENTS

2017/0199097 A1* 7/2017 Placko ............... G01M 9/065
2019/0354657 A1* 11/2019 Placko ............... G06F 30/23

OTHER PUBLICATIONS

Banerjee, Sourav, Tribikram Kundu, and Nasser A. Alnuaimi. "DPSM technique for ultrasonic field modelling near fluid-solid interface." Ultrasonics 46.3 (2007): 235-250. (Year: 2007).*
French Search Report and Written Opinion received for French Application No. 1857440 dated Jul. 1, 2019.
International Search Report and Written Opinion for PCT/EP2019/071286 mailed Oct. 22, 2019.
Placko, D., et al., "Extension de la méthode de modélisation multi-physique DPSM à l'analyse d'écoulements fluidiques, par exploitation des analogies avec les domaines de l'électromagnétisme et des ultrasons," 7ème Colloque Interdisciplinaire en Instrumentation, 2016, Saint-Nazaire, France, 12 pages. (English Abstract).

* cited by examiner

METHOD FOR SIMULATING A FLOW IN WHICH A STRUCTURE IS SUBMERGED

BACKGROUND

The present invention relates in particular to the field of fluid mechanics. More particularly, the invention relates to a method for simulating a flow, for example a fluid flow, in which a structure is submerged.

The invention can also be applied to a flow having the form of a wave.

The invention relates in particular to determining forces being applied to said structure when it is positioned in the flow.

In the state of the art, there are several methods that make it possible to carry out flow simulations and simulations of interactions of said flow with an object or a structure, such as the methods known as CFD, for Computational Fluid Dynamics. These methods make very accurate calculations possible. However, these methods require very significant calculation times and resources. In fact, these methods do not come to a solution quickly and require several iterations. They are thus not suitable for carrying out calculations called "real-time" calculations of simulations of flow around a structure. This type of method is thus always used to carry out calculations non-simultaneously.

Taking a specific application example such as a flight simulator manoeuvring in the three dimensions in space, the simulator can reproduce as reliably as possible, in real time, the movement of the aircraft. To this end, the simulator must be able to move proportionally to the forces applied to the aircraft. The forces applied to the aircraft are in particular dependent on the fluid flow in which the aircraft manoeuvres. The models currently used to simulate a flight rely on using tabulated data giving aerodynamic characteristics of the aircraft as a function of a number of fixed parameters and for certain values of these parameters. These aerodynamic data tables originate in particular from test flights. The parameters then correspond to a flight configuration of the test aircraft. Collecting these data makes it possible to determine global data of the type coefficient of drag, coefficient of lift, which are taken into account by a conventional flight mechanics model. The flight mechanics models calculate the reactions of the aircraft using the principles of balancing the forces and moments applied at one point, generally a barycentre, of the aircraft. The results obtained are thus representative of aeroplane configurations specific to the test flights carried out. These conditions are thus absolutely not representative of other configurations and in particular real configurations of aircraft. This point can be crucial for the training and instruction of aircraft pilots. In fact, an aircraft, according to its configuration, can have different behaviours and in particular different flight mechanics. It is thus important that flight simulators can reproduce the behaviours of the aircraft as reliably as possible, in particular for training for incidents taking place in conditions close to the boundaries of the flight range of the aircraft. These boundaries of the flight range of the aircraft are highly dependent on the configuration of the aircraft.

SUMMARY

An aim of the invention is in particular to propose a method for rapid and accurate calculation of the lines representing the direction of the flow in which the structure is submerged.

To this end, the present invention proposes a method for simulating a flow in which a structure is submerged. The method according to the invention is implemented by computer, the behaviour of said structure in the flow being modelled by radial and rotational sources generating a velocity field representing the flow around the structure, said method being characterized in that it can comprise at least the following steps:

- a first step of defining vectors characteristic of the initial flow as a function of the velocity of said flow in an orthonormal coordinate system, in the absence of said structure in the flow;
- a second step of calculating a first set of flow vectors by applying the DPSM technique to the radial sources and imposing the nullity of the components of the vectors characteristic of the flow, normal to the surface of the structure, as boundary conditions, in order to calculate the values of the radial sources;
- a third step of calculating displaced elementary volumes of the structure for each segment of said structure, said structure being cut into several segments, along each of the axes of the coordinate system, and of calculating mean values of the rotational sources along each axis of the coordinate system for the displaced elementary volumes of each segment;
- a fourth step of calculating a second set of flow vectors for each rotational source using DPSM with the nullity of the sum of the vectors of the flow tangential to said surface over the whole contour of each segment as boundary conditions, in order to calculate the values of the rotational sources;
- a fifth step of calculating a third set of flow vectors for each rotational source using DPSM with the conservation of the vorticity of the flow as boundary conditions, in order to calculate the values of the rotational sources;
- a sixth step of combining all of the calculations carried out during the preceding steps, in order to obtain a fourth set of flow vectors simulating the flow in which said structure is placed.

The present invention can preferably comprise at least the abovementioned steps, but it can also comprise all or some of the abovementioned steps optionally modified or combined with other steps. In particular, in order to speed up the calculations, it is possible to envisage methods for obtaining velocity vectors avoiding matrix inversion operations, as will be seen below. The combination of the calculations can be carried out by adding together the fields of vectors obtained during each step.

Combining the calculations can comprise constructing a vector bringing together all the boundary conditions associated with each of the radial and rotational sources, constructing a coupling matrix between the boundary conditions and the sources, bringing together all the calculations carried out in order to obtain the first, second and third sets of flow vectors as a function of the different sources.

The second step can comprise a calculation, for each segment, of stagnation points of the flow vectors on the structure, said stagnation points being determined by a change of sign of vectors resulting from a cross product for each point of the contour of the segment between a flow vector on the point of the contour of the segment and a vector normal to the contour of said segment at said point of the contour.

The surface area of the displaced volumes can be approximated by an equivalent surface area one dimension of which corresponds to the distance between every stagnation point in the plane of the segment projected onto an axis of the segment perpendicular to the flow vectors obtained during the first step and another dimension of which is the distance travelled by the segment during the displacement of the structure.

Said method can comprise a seventh step of once again calculating stagnation points for each segment as a function of the flow vectors calculated during the sixth step, said new stagnation points being used during the second step for a new iteration of said method according to the invention, said new iteration starting from the second step of the method.

The orthonormal coordinate system can be a coordinate system for the structure.

The orthonormal coordinate system can be a coordinate system for the flow.

Said method can also comprise a step of determining forces applied to the structure as a function of the radial and rotational sources calculated, as well as flow vectors.

Said method can be implemented by a flight simulator, for each elementary structure making up an aircraft.

Said method can simulate a fluid flow.

The force applied can be a lift force calculated by a cross product of the flow vector deployed in matrix form and of a vector composed of the rotational sources along each of the components of the coordinate system.

The force applied can be a drag force calculated by producing the scalar product between a matrix, composed on its diagonal of the components of the flow vector, and a radial source vector each of the components of which is the scalar value of the radial source.

The flow can be a wave field.

Said method can be applied to an electromagnetic field.

Said method can be implemented by a non-destructive testing device.

The invention also relates to a computer program product containing instructions which, when the program is executed by a computer, cause the latter to implement the steps of the method according to the invention.

The invention also relates to a computer-readable recording medium containing instructions which, when they are executed by a computer, cause the latter to implement the steps of the method according to the invention.

The invention consists in particular of modelling objects having complex structures, such as aircraft, by points called source points and calculating the interaction of these source points with the environment of the object in order to define the forces applied to the object. To this end, the invention uses the distributed point source method, called DPSM, for calculating interactions between objects in three dimensions, as described in patent application FR3021405. Thus, the invention provides data on the boundary conditions applied to the interface between the object and the flow in order to determine a matrix called coupling matrix between the sources and the boundary conditions. This coupling matrix makes it possible to determine the magnitude and the spatial direction of the flow vectors generated by the sources. Thus the invention then makes it possible to calculate forces applied to the object submerged in the flow by using the teaching of patent application FR1750153.

The invention thus provides a method for directly calculating a flow in three dimensions on the basis of the physical equations governing the circulation of the flow around the object. This calculation method is very accurate due to its proximity to the real physics of the problem. This calculation method is compatible with a calculation method called real time calculation which recalculates at each time interval the flow according to the displacement of the object in this flow, for example.

To this end, the invention uses a method called "displaced flow" or "displaced volumes" method, which makes it possible to quantify a mean value which must satisfy the sources arranged in a segment of the object. The object can in fact be broken down into several segments or volume elements, in each of the three dimensions. For example, an aeroplane wing can be cut into segments parallel to the incident vectors of the fluid in which the wing is submerged. Each segment can include a set of sources the unit value of which satisfies local boundary conditions while the mean values of the sources satisfy macroscopic boundary conditions. According to DPSM, each source point is associated with a point called test point situated at the interface between the object and the fluid. For the example, a wing can have a mesh of approximately one thousand test points and an equivalent number of source points. The wing can be cut for example into about ten segments parallel to the fluid flow. Thus each segment comprises about one hundred source points. The number of source points can be reduced, in order to improve the calculation time by using for example their barycentres on a mesh of the segment, in order to obtain for example about ten source points. This simplification is based on modelling of the far field type which consists of taking account of the fact that the field at a significant distance (called infinite distance) from the object no longer presents disturbances associated with the passage of the object.

BRIEF DESCRIPTION OF THE DRAWINGS

Other advantages and characteristics of the invention will appear on examination of the detailed description of the non-limitative embodiments, and the attached drawings, in which.

DETAILED DESCRIPTION

The embodiments that will be described hereinafter are in no way limitative; in particular, variants of the invention can be implemented comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described are provided in order to be combined together in all combinations where there is no objection thereto from a technical point of view.

The different embodiments of the present invention comprise various steps. These steps can be implemented by machine instructions that can be executed by means of a microprocessor for example.

Alternatively, these steps can be carried out by specific integrated circuits comprising a hard-wired logic for executing the steps, or by any combination of programmable components and customized components.

The present invention can also be provided in the form of a computer program product which can contain a non-transitory computer-readable recording medium containing instructions that can be executed on a data-processing machine, these instructions being capable of being used to program a computer (or any other electronic device) to execute the method.

The present invention relates to a method for simulating a flow in which a structure is submerged. In the example of the embodiment presented, the structure is a wing of an aeroplane and the flow is a fluid, in this case air. The present invention can be applied to any structure submerged in a flow, whether this is a fluid, for example water, or a wave-like flow, for example an electromagnetic field, an acoustic field. The invention is particularly advantageous in the case of a complex structure, i.e. composed of several structures, such as an aircraft, a ship, a wind turbine, a tidal turbine.

Figure 1:
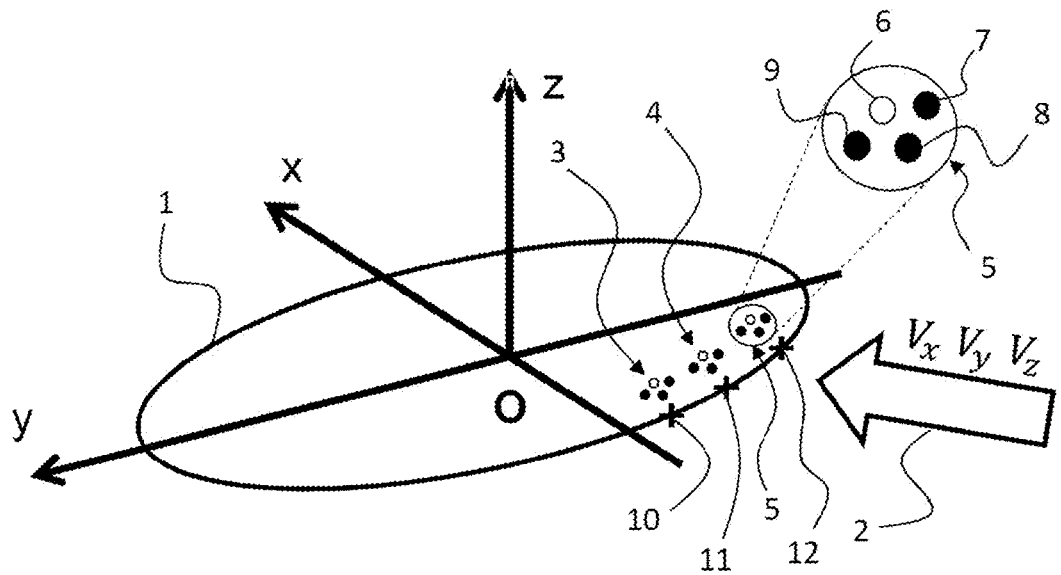
FIG. 1 represents an object submerged in a flow.

In the application example as represented in FIG. 1, a structure 1 is placed in a flow 2. The flow 2 can be represented by a field of vectors, or a vector field. This field of vectors is modelled hereinafter by a flow velocity vector $\vec{V}$.

An orthonormal coordinate system (0, x, y, z) is for example defined for the structure 1, it is a coordinate system fixed with respect to the structure. The orthonormal coordinate system can, in another embodiment, be the coordinate system for the flow.

The components of the flow vector V according to an orthonormal coordinate system (0, x, y, z) of the structure 1 are $V_x$, $V_y$, $V_z$.

The behaviour of the structure 1 in the flow is modelled according to DPSM (distributed point source method). The behaviour of the structure 1 in the flow is thus modelled by several sets 3, 4, 5 of sources generating a flow. The sets of sources 3, 4, 5 can comprise a radial source 6, also called scalar source, and several rotational sources 7, 8, 9 also called vector sources. The sets of sources generate a velocity field representing the flow around the structure 1. Three rotational sources 7, 8, 9 are represented in FIG. 1 and by way of example. Each rotational source can be relative to one of the axes (x, y, z) of the orthonormal coordinate system.

DPSM requires a definition of the boundary conditions on test points 10, 11, 12 situated at the interface between the structure 1 and the flow 2 with respect to each set of source points 3, 4, 5. The boundary conditions express the physical constraints associated with the presence of the structure 1 in the flow 2. DPSM makes it possible to calculate the value of the sources, i.e the value of the flow emitted by the sources. The value of the flow emitted by the sources makes it possible to determine the vector field around the structure.

Figure 2:
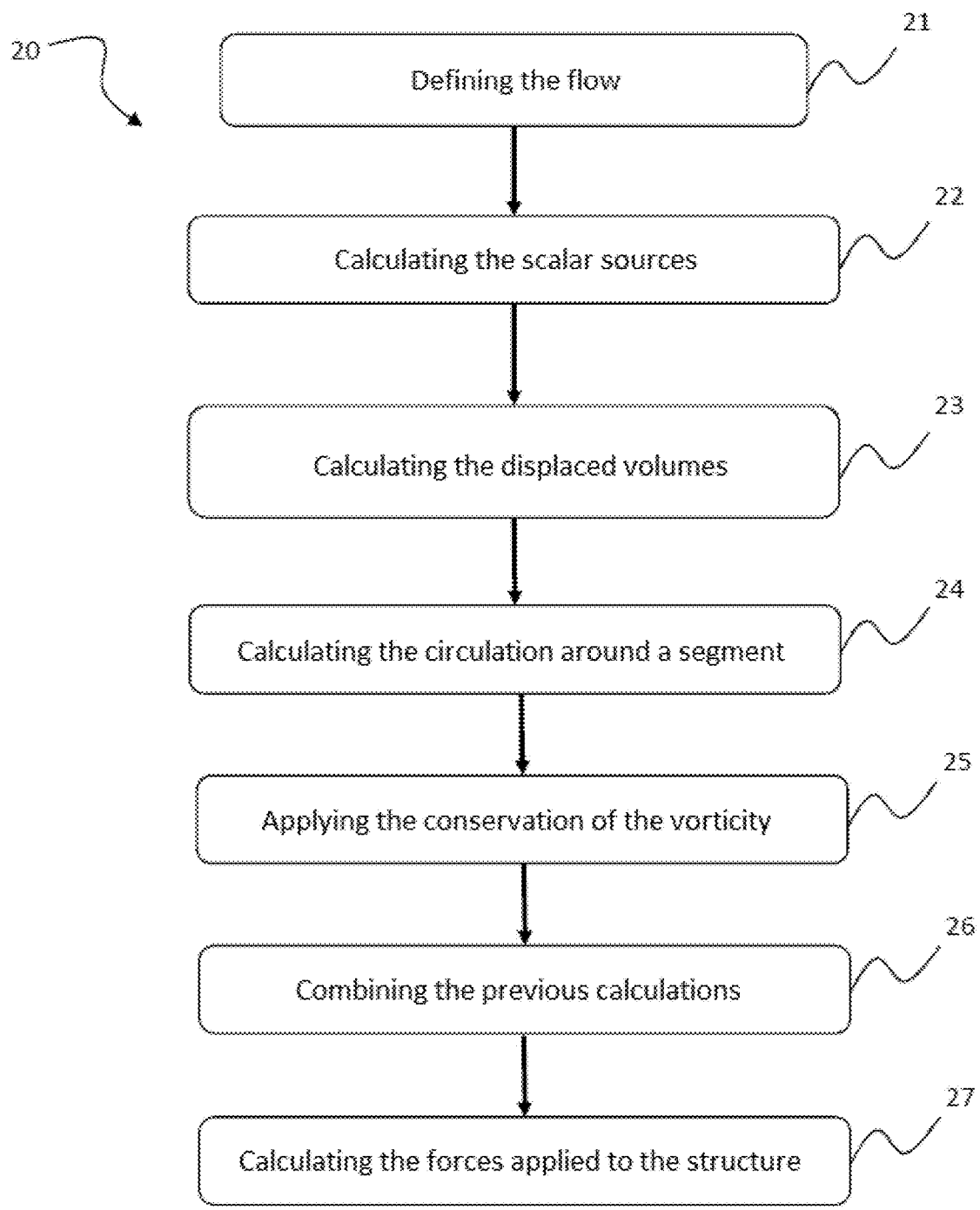
FIG. 2 represents different steps of the method according to the invention.

FIG. 2 diagramatically represents several steps of the simulation method 20 according to the invention.

A first step 21 of the method 20 according to the invention is a step of defining vectors characteristic of the flow 2. The vectors characteristic of the flow represent a field of vectors, or vector field, defined in the absence of said structure 1 in the flow 2.

According to the Helmholtz-Hodge theorem, a vector field can be broken down into a component called longitudinal component, i.e. irrotational, and a component called transverse component, i.e. solenoidal. A vector field, solution of the equations, can thus be expressed as the sum of a potential gradient and a vector potential curl.

In the example used to describe the method according to the invention, an aeroplane wing positioned in a flow of air or wind is considered.

It is possible for example to define the initial vector field, or characteristic vectors, as follows: $\overrightarrow{V(Px)} = \overrightarrow{V1(Px)}$, where Px is any point in space and $\vec{V1}$ is a wind defined at every point in space.

The wind can be either constant for example in the context of a stabilized flight of an aircraft or variable in the presence of local turbulence, or if the structure is a helicopter blade for example.

Figure 3:
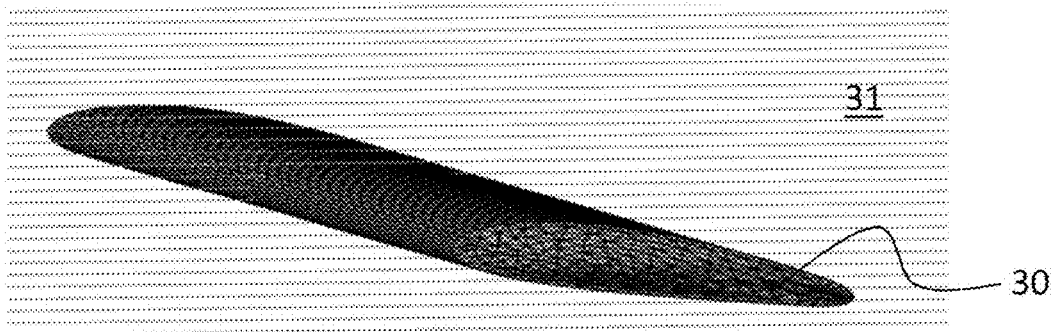
FIG. 3 represents a first field of flow vectors without an obstacle.

FIG. 3 represents a wing 30 superposed on a first vector field 31 representing the velocity field of the fluid in which the object will be submerged. As represented in FIG. 3, the wing has no effect on the flow 31.

A second step 22 of the method 20 according to the invention is a step of calculating a first set of flow vectors by applying DPSM to the radial sources 6 and imposing the nullity of the components of the vectors characteristic of the flow, normal to the surface of the wing 30, as boundary conditions.

If the vector normal to the surface of the structure 30 is defined as $\vec{N}$, then the normal component of the vector flow can be written $(\overrightarrow{V_1(Pt)} \cdot \vec{N})$. $\vec{N}$ at a test point Pt situated on the surface of the wing, thus at the interface between the structure and the object submerged in the flow.

The boundary condition CL is imposed on the test points during this step. This boundary condition can be written:

$$-CL(Pt) = (\overrightarrow{V_1(Pt)} \cdot N) \qquad (1000)$$

If Green's function is used to model the problem, then:

$$\overrightarrow{G(P, S)} = \frac{\vec{PS}}{4 \cdot \pi \cdot \rho \cdot \|\vec{PS}\|^3} \qquad (1001)$$

is obtained, where P is a test point for example, S is a point source and ρ is the density of the fluid.

The system to be resolved in order to find the value λ of the scalar sources can be expressed in this way:

$$CL = M * \lambda \quad (1002)$$

The matrix M for the second step of the method according to the invention can be expressed as:

$$M(P,S) = (\overrightarrow{G(P,S)} \cdot \overrightarrow{N_s}) \quad (1003)$$

the vector $\overrightarrow{N_s}$ being a vector normal to the surface at a test point.

The equation (1002) can then be developed in the following form:

$$\begin{pmatrix} -CL(p_1) \\ \vdots \\ -CL(p_{np}) \end{pmatrix}_{np} = \begin{pmatrix} M(1,1) & \ldots & M(1,ns) \\ \vdots & M(P,S) & \vdots \\ M(np,1) & \ldots & M(np,ns) \end{pmatrix}_{np*ns} * \begin{pmatrix} \lambda_1 \\ \vdots \\ \lambda_{ns} \end{pmatrix}_{ns} \quad (1004)$$

where np is the number of test points and ns is the number of source points under consideration.

By inversion of the matrix M, the value of the scalar sources 2 is obtained as a function of the boundary conditions:

$$\lambda = M^{-1} * CL \quad (1003)$$

Figure 4:
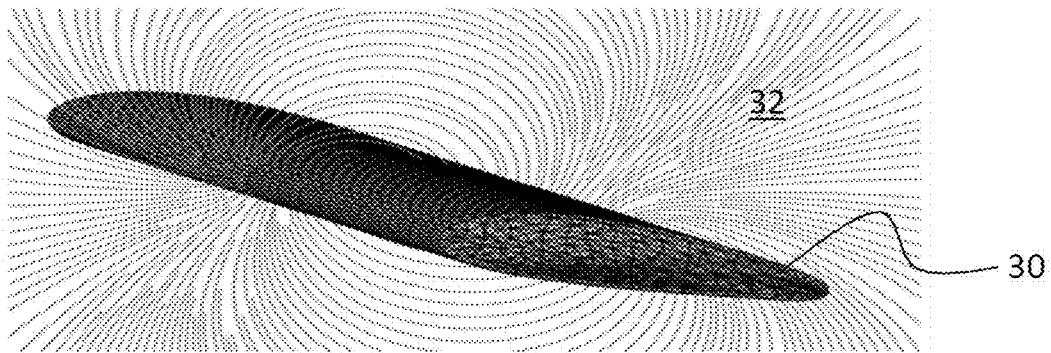
FIG. 4 represents a second field of flow vectors generated by radial sources of the structure.

This second step 22 makes it possible to seal the wing with respect to the flow. The flow vectors resulting from the second step 22 are second flow vectors 32 comprising, for a single component, the tangential component $\overrightarrow{V^{\parallel}}$ of the wind $\overrightarrow{V_1}$ at the surface of the wing as represented in FIG. 4, where $\overrightarrow{V_1} = \overrightarrow{V^{\perp}} + \overrightarrow{V^{\parallel}}$, $\overrightarrow{V^{\perp}}$ being the normal component.

A third step 23 of the method according to the invention is a step of calculating displaced elementary volumes. Calculating the displaced elementary volumes makes it possible to specify a boundary condition for the rotational sources, i.e. the rotational component of the vector field, by imposing their mean value on a volume. The boundary condition on the scalar sources is kept for this third step 23.

Firstly, the wing 30 is cut into geometric segments of a given thickness in a given plane. In the example represented in FIG. 5, the plane under consideration is a plane parallel to the plane (x0z). Each segment has a given thickness Ly and all of the segments form the wing 30. The same third step 23 is carried out for each segment of the wing parallel to the planes (y0z), (x0y), (x0z).

Figure 5:
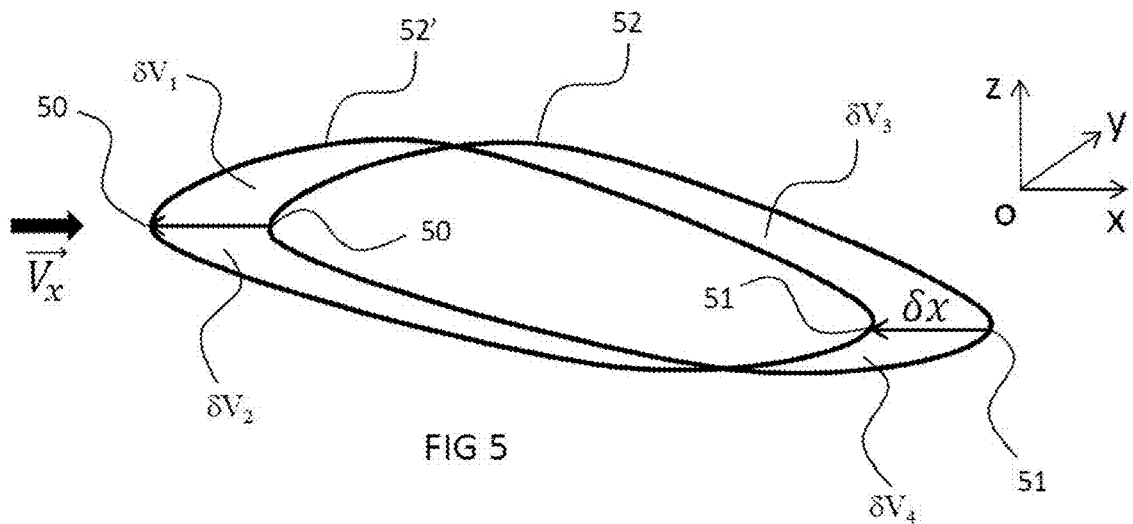
FIG. 5 represents volumes displaced during a period of time of a displacement of the structure.

FIG. 5 shows volumes displaced by δx for a short time St of displacement of the wing 30 along the axis x. δx is much smaller than the dimensions of the object which is displaced.

When taking into consideration a wind $\overrightarrow{V_x}$, i.e. the component of the wind $\overrightarrow{V_1}$ along the axis x, stagnation points 50, 51 of the flow are determined on a segment 52 of the wing. A first stagnation point 50 is found on the leading edge of the wing, a second stagnation point 51 is found on the trailing edge of the wing, in the example represented in FIG. 5.

Figure 6A:
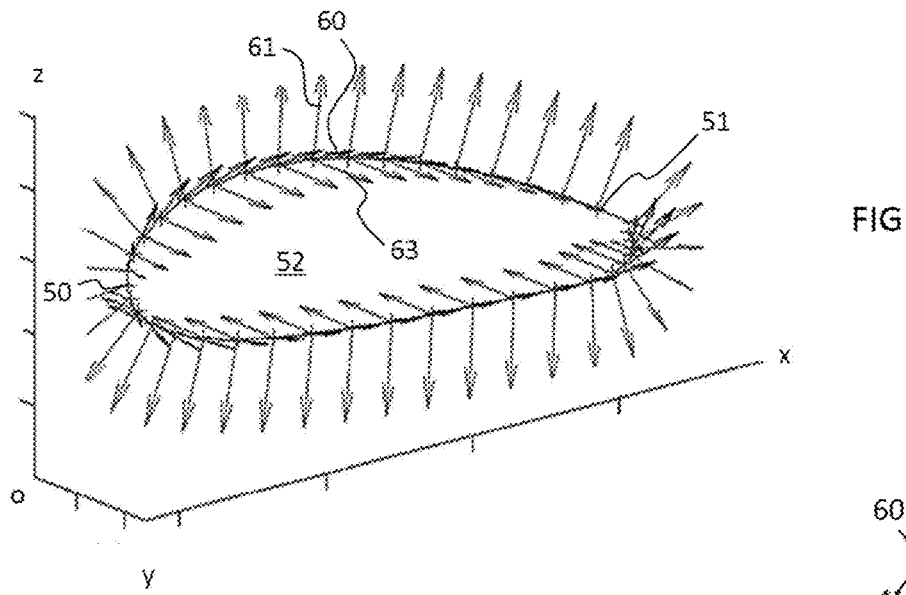
FIG. 6a represents a first view of the components of the flow tangential to the surface of the structure at several points of the contour of a segment of the structure.
Figure 6B:
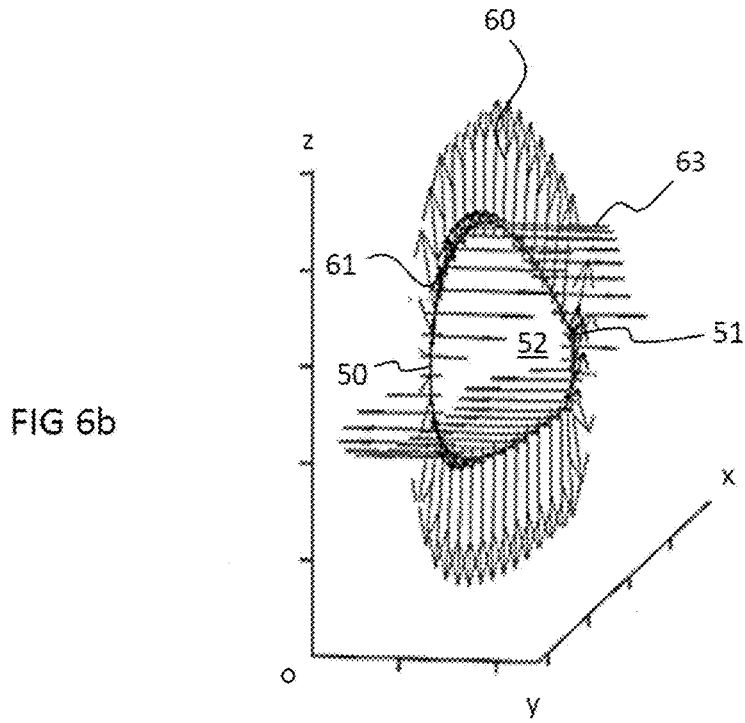
FIG. 6b represents a second view of the components of the flow tangential to the surface of the structure at several points of the contour of a segment of the structure.

The stagnation points 50, 51 are determined as represented in FIGS. 6a and 6b. FIGS. 6a and 6b show components 60 of the flow tangential to the surface of the wing at several points of the contour of the segment 52. Tangential vectors 60 are obtained. For each tangential vector 60 of the flow, a vector 61 normal to the contour of the segment 52 is calculated. Then for each point of the contour, a cross product vector 63 is calculated, resulting from the cross product of the normal vector 61 and the tangential vector 60. The sign of each cross product vector 63 is given by the scalar product of the normal vector 61 and the tangential vector 60. A point for which a change of sign of the cross product vector is produced indicates a stagnation point on the contour of the segment 52. In FIGS. 6a, 6b it is possible to observe two stagnation points 64, 65, including a stagnation point 64 on the leading edge of the wing and a stagnation point on the trailing edge of the wing.

In FIG. 5, the displacement of the segment is carried out in the opposite direction to the wind vector $\overrightarrow{V_x}$. The displaced segment 52' is represented with a difference of position of δx corresponding to the displacement of the segment 52 for the time δt. The geometric line connecting the stagnation points 50, 51 of the segment to the corresponding stagnation point of the displaced segment 52' makes it possible to geometrically define four volumes, represented by the surface areas $\delta V_1$, $\delta V_2$, $\delta V_3$, $\delta V_4$, where $\delta V_1 < 0$, $\delta V_2 < 0$, $\delta V_3 > 0$ and $\delta V_4 > 0$, and of thickness Ly.

The total displaced volume is zero, it is thus possible to express it by $\delta V_1 + \delta V_2 + \delta V_3 + \delta V_4 = 0$.

Also $\delta V_1 \neq \delta V_3$ and $\delta V_2 \neq \delta V_4$. It is then possible to define an upper displaced volume difference $\delta V_{upp} = \delta V_3 + \delta V_1$ and a lower displaced volume difference $\delta V_{low} = \delta V_4 + \delta V_2$. Thus:

$$\delta V_1 + \delta V_2 + \delta V_3 + \delta V_4 = \delta V_{upp} + \delta V_{low} \quad (1004)$$

It can be noted that, in the case of a wing, the presence of ailerons, or deployed wing flaps, or also a wing tip, modifies the distributions of the volumes $\delta V_3$ with respect to $\delta V_4$ and $\delta V_1$ with respect to $\delta V_2$.

In another embodiment it is possible to consider the total displaced absolute volume instead of δV. The total displaced volume being zero, it is possible, in the same manner, to define a displaced absolute volume $\delta V'_{upp} = \delta V_3 - \delta V_1$ and $\delta V'_{low} = \delta V_4 - \delta V_2$. The total displaced volume is then expressed in this way: $\delta V'_{upp} + \delta V'_{low} = \delta V_3 - \delta V_1 + \delta V_4 - \delta V_2 = -2(\delta V_1 + \delta V_2) = 2(\delta V_3 + \delta V_4)$.

The flow rate necessary for a rotational source Rx associated with the segment 52, according to DPSM, is such that $Rx = \rho \delta V/\delta t$, and this is without previously knowing the lift coefficient. The rotational source Rx can be considered as a mean of all of the rotational sources present in the segment 52.

Figure 7:
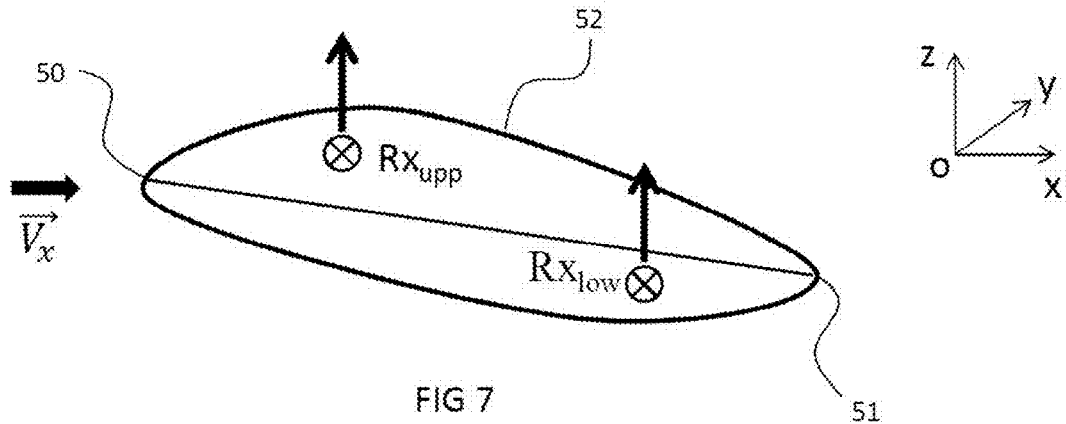
FIG. 7 represents a breakdown of one rotational source on a segment into two rotational sources.

It is possible to break the rotational source Rx down into two rotational sources $Rx_{upp}$ and $Rx_{low}$ as represented in FIG. 7.

Then $Rx_{upp} = \rho \delta V_{upp}/\delta t$ and $Rx_{low} = -\rho V_{low}/\delta t$, respectively the flow rate necessary for the rotational sources $Rx_{upp}$ and $Rx_{low}$. $Rx_{upp}$ and $Rx_{low}$ can be expressed in Kg/s.

The different volumes have an impact on the lift:
the lift coefficient Cz is even larger because $|\delta V_3|$ is large and $|\delta V_1|$ is small;
the lift coefficient Cz is even larger because $|\delta V_2|$ is large and $|\delta V_4|$ is small.

Figure 8:
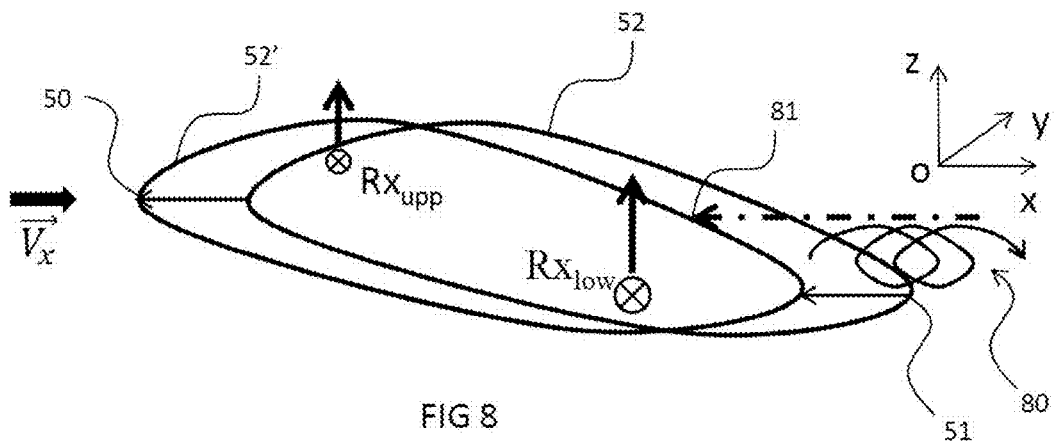
FIG. 8 represents a separation of the air streams on a suction face of the structure.

If a separation 80 of the air streams takes place on a suction face of the wing, as represented in FIG. 8, then $|\delta V_3|$ is reduced and a third stagnation point 81 appears near the trailing edge of the wing. In this case, $Rx_{upp}$ is reduced and $Rx_{low}$ remains substantially equal to the previous case, without separation of the air streams. The appearance of a separation can take place when baffles are present on the suction face of the wing. The suction face of the wing is defined as the upper part of the wing.

Figure 9:
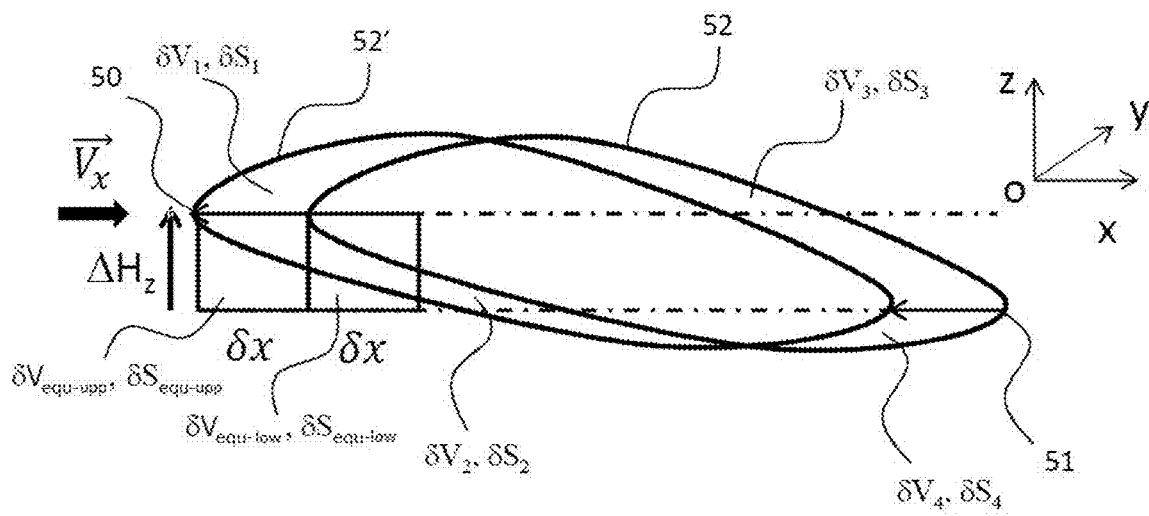
FIG. 9 represents an equivalent displaced volume on the segment of the structure.

It is then possible to define a concept of equivalent displaced volume by introducing a total frontal surface of the wing defined by the difference in height $\Delta Hz$, according to a projection onto the z axis of the stagnation points 50, 51 as represented in FIG. 9. Thus it is possible to express an upper equivalent displaced volume taking into account the thickness of the segment:

$$\delta V_{equ-upp}=\Delta Hz.\delta x.Ly \quad (1005)$$

Similarly, it is possible to express a lower equivalent displaced volume taking into account the thickness of the segment:

$$\delta V_{equ-low}=-\Delta Hz.\delta x.Ly \quad (1006)$$

Thus it is possible to approximate the displaced volume $\delta V$ by $2.\Delta Hz.\delta x.Ly$.

The introduction of the equivalent displaced volume in the calculations makes it possible to improve the performance, in terms of speed, of the calculations.

Considering not the volumes, but the displaced surface areas $\delta S_1$, $\delta S_2$, $\delta S_3$, $\delta S_4$, where $\delta S_1<0$, $\delta S_2<0$, $\delta S_3>0$ and $\delta S_4>0$, according to the same principle as for the volumes, it is possible to approximate an equivalent surface area swept during the displacement of the wing by:

$$\delta S=2.\Delta Hz.\delta x \quad (1007)$$

Then $\delta S/\delta t=2.\Delta Hz.\delta x/\delta t$ or $\delta S/\delta t=2.\Delta Hz.Vx$ expressed in $m^2/s$.

Figure 11:
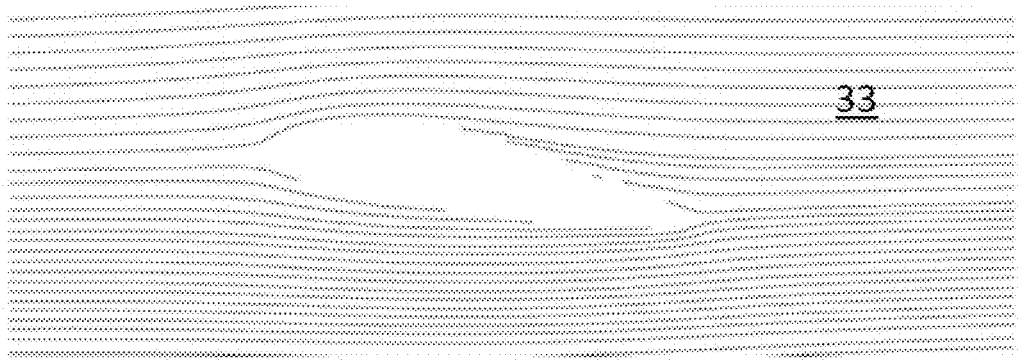
FIG. 11 represents a third field of flow vectors around a segment of the wing.

It is thus possible to calculate a third flow vector field 33 around the wing as represented in FIG. 11.

A fourth step 24 uses a calculation of circulation around the surface, in particular of circulation around a segment of the wing in order to determine the value of the rotational sources.

D'Alembert's paradox states that the potentials of the velocities on the pressure face and suction face path of a segment of the wing do not cause any difference in potential to appear. This can be interpreted as the fact that there is no lift, which is not the case. The streamlines thus are not in agreement with the real physics of the system of the wing. In order to resolve this paradox, Kutta and Jukowski have put forward a hypothesis, in the form of a theorem making it possible to calculate the lift P and to correct the velocity potentials:

$$P=\rho.V.\Gamma.Ly \quad (1008)$$

where $\Gamma$ is the circulation on the contour of the wing such as $\Gamma=\oint \vec{V}.\vec{dl}$, sticking with the example of a segment of the wing along the plane (x0z) with a thickness Ly.

Advantageously, the value of the circulation around an object of any shape being displaced in a fluid can thus be determined.

It is also possible to express the lift as a function of the value of the sources: $P=\rho.V.\Gamma.Ly=V.(\rho.\Gamma.Ly)=V.R$.

In fact, applying Stokes' theorem, the circulation of the velocity field on the contour of a segment is equal to the curl of the velocity field on the area of the segment $\Gamma=\oint_{contour} \vec{V}.\vec{dl}=\iint_{area}rot(\vec{V}).\vec{ds}=\iint_{area}\vec{w}.\vec{ds}$, where $\vec{w}$ is the expression of the vorticity: $\vec{w}=rot(\vec{V})$.

In this example, only the component in y of the vorticity (or vortex) is taken into account: $\vec{w}y$.

Thus the components of the rotational sources are associated with the components of the vorticity by:

$$R_y=\rho.Ly.\iint_{area}\vec{w}y.\vec{ds} \quad (1009)$$

Or in a simplified manner by:

$$R_y=\rho.Ly.\text{Area}\vec{w}y.\vec{ds} \quad (1010)$$

Figure 10:
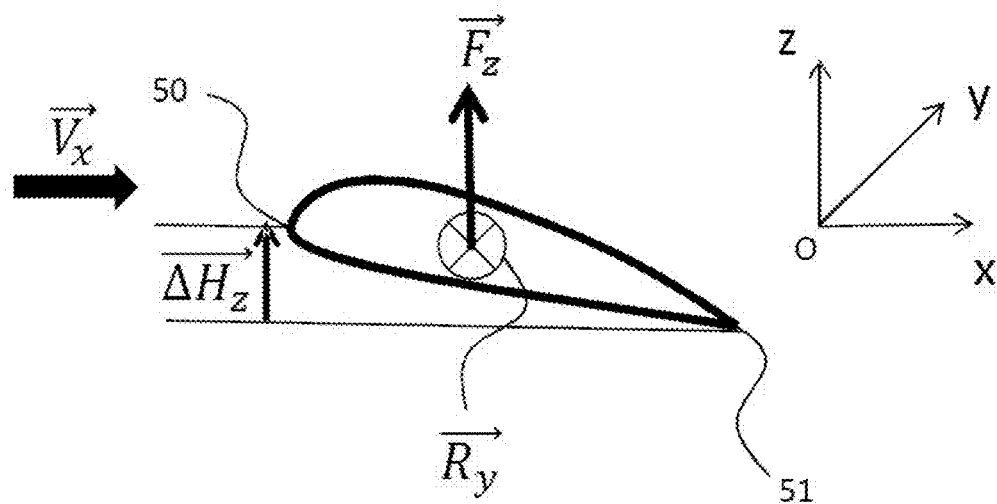
FIG. 10 represents a profile of a wing placed in a wind.

In this example, Area is the area of the cutting plane of the wing represented as represented in FIG. 10.

Finally:

$$\Gamma=\oint \vec{V}.\vec{dl}=2.\Delta H_z.V_x=\iint_{area}\vec{w}.\vec{ds}=R_y.(\rho.Ly)^{-1} \quad (1011)$$

is obtained.

Therefore $$R_y=\Gamma.\rho.Ly=2.\Delta H_z.V_x.Ly \quad (1012)$$

This makes it possible, by imposing the nullity of the contour of the segment, to calculate the value of the rotational source $R_y$. The value of the rotational source makes it possible to define the flow generated by said rotational source using DPSM.

The rotational source thus makes it possible to provide a potential difference of the vector field between the pressure face and the suction face of the wing, thus generating a lift.

The fourth step 24 is applied to each segment of the wing, along each axis of the coordinate system for the wing.

The expression (1012) can be generalized, as illustrated in FIG. 10, in order to calculate each vector source $R_x$, $R_y$, $R_z$.

In FIG. 10, the wind vector $\vec{V_x}$ is represented along the x axis, the height is represented along the z axis between the stagnation points 50, 51 respectively situated on the leading edge of the wing and on the trailing edge of the wing, and the radial source $\vec{R_y}$ is represented along the y axis. The lift force generated by the source $\vec{R_y}$ is $\vec{F_z}$ along the z axis.

In this way:

$$\vec{R_y}=2.Ly.\rho.\overrightarrow{\Delta H_z}\wedge \vec{V_x} \quad (1013)$$

is obtained.

By generalizing to the vector $\vec{R}$ composed of all of the components $R_x$, $R_y$, $R_z$ of the rotational sources:

$$\vec{R}=2.L.\rho.\overrightarrow{\Delta H}\wedge \vec{V} \quad (1014)$$

is obtained, where $\overrightarrow{\Delta H}=(\Delta H_x, \Delta H_y, \Delta H_z)$ is the difference in height between the stagnation points 50, 51 along each axis x, y, z; $L=(L_x, L_y, L_z)$ is the thickness of each segment along each axis and $\vec{V}=(V_x, V_y, V_z)$ is the velocity vector of the flow.

Thus it is then possible to calculate the rotational sources as a function of the displaced volumes in the three directions of the orthonormal coordinate system because $$\vec{R}=\rho\cdot\frac{\delta v}{\delta t} \quad (1015)$$

$\delta v$ representing a small displaced volume.

Figure 12:
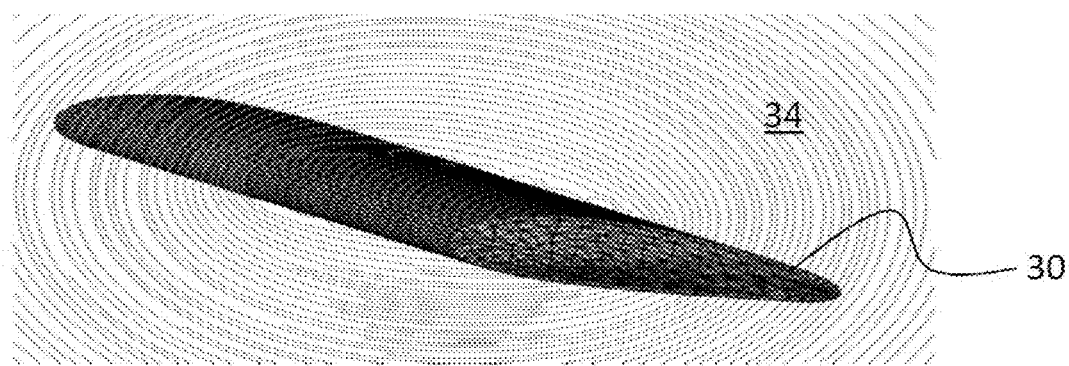
FIG. 12 represents a fourth field of flow vectors around the wing.

The contribution of each source to the flow is then added together, in order to obtain a fourth velocity field 34 as represented in FIG. 12.

A fifth step 25 of the method according to the invention is a step of calculating a fourth set of flow vectors for each rotational source. The fifth step of the method according to the invention implements the application of the boundary conditions to the conservation of the vorticity of the flow generated by the rotational sources.

The conservation of the vorticity w is expressed as follows:

$$div(\vec{w}) = \frac{dw_x}{dx} + \frac{dw_y}{dy} + \frac{dw_z}{dz} = 0 \quad (1016)$$

For example, to describe this boundary condition for a rotational source $R_x$, it is considered that the flow lost along the x axis is found along the y axis.

Starting from the principle that the sum of the rotational sources of a segment is equal to the displaced flow for this segment, then the value of the flows for each segment is known according to the third step 23. Thus, the lost flow is obtained by producing the differences in the flows F(between each segment.

For example, if the number of segments ntr is set along one of the axes, the flow delta ΔF between two consecutive segments, for example a first segment n and a preceding segment n−1, can be expressed in this way: ΔF(n)=F(n−1)−F(n). In the same way, the flow delta between a third segment p and a following segment p+1 can be expressed: ΔF(p)=F(p+1)−F(p).

In order for the calculation to be complete, a correction is carried out on the difference in order to bring the thickness of the segments along the x axis into play. This difference is theoretically infinite. In order to obtain a total modification, it would be necessary to add sources into the wake of the wing in order to completely model the eddies in the airflow. In practice, beyond the halfway point of the wingspan, the sources $R_x$ become negligible. Thus it is possible to determine a $$\Delta F_{corrected} = \Delta F * \frac{\text{Span}/2}{\text{segment thickness }(y)}$$

where Span is the total wingspan and segment thickness (y) is the thickness of the segment along the y axis. $\Delta F_{corrected}$ gives a vector of boundary conditions for calculating the rotational sources $R_x$.

In the same way, it is possible to calculate the rotational sources $R_y$ and $R_z$ and thus to obtain the values of these sources corresponding to the application of the boundary condition of conservation of the vorticity.

Figure 13:
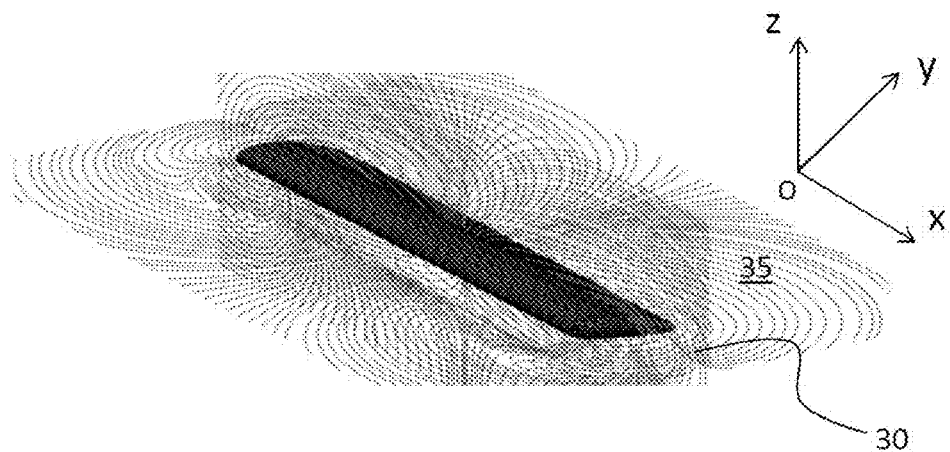
FIG. 13 represents a fifth field of flow vectors around the wing.

Thus it is possible to calculate a fifth field 35 of vectors according to DPSM, as represented for example in FIG. 13. For the sake of clarity, only the components of the field of vectors along the y and z axes have been represented.

Figure 14:
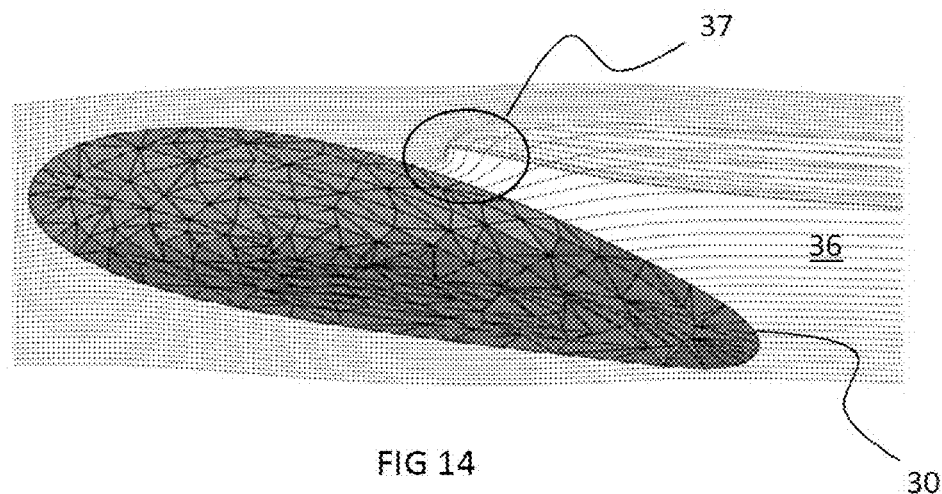
FIG. 14 represents a sixth field of flow vectors around the wing.

A sixth step 26 of the method according to the invention is a step of combining calculations performed during each of the steps in order to obtain a sixth set of flow vectors resulting around the wing 30 simulating the flow in which the wing is placed. In FIG. 14, it is possible to see an example of a sixth flow calculated in this way and in particular a snag 37 of the air streams on the suction face of the wing 30.

The different steps of the method according to the invention can be described in matrix form.

Generally, a segment is a geometric segment of the structure. The segments have a given thickness and are cut in the structure parallel to a given plane. The plane depends on the source which it is desired to calculate. For example in order to calculate a rotational source $R_y$, the plane used to cut the segments is the plane (x, z). Each segment is defined by a set of test points situated on the interfaces of said segment with the medium outside the structure. For example a segment $T(y_1, y_2)$ contains the test points the co-ordinates of which along the y axis are comprised between $y_1$ and $y_2$. A total displaced flow is thus calculated for each segment. This total displaced flow is equal to the sum of the sources for this segment.

For example, eight sources $S_1$, $S_2$, $S_3$, $S_4$, $S_5$, $S_6$, $S_7$, $S_8$, distributed in the structure, are considered. Cutting into segments along the y axis can be done in four segments respectively containing the sources $(S_1, S_2)$, $(S_3, S_4)$, $(S_5, S_6)$, $(S_7, S_8)$. If $F_{ti,y}$ is named the sum of the displaced flows for the segment ti obtained for the cutting along the y axis, then the matrix is written:

$$\begin{pmatrix} F_{t1,y} \\ F_{t2,y} \\ F_{t3,y} \\ F_{t4,y} \end{pmatrix} = \begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{pmatrix} * \begin{pmatrix} \lambda_{1y} \\ \lambda_{2y} \\ \lambda_{3y} \\ \lambda_{4y} \\ \lambda_{5y} \\ \lambda_{6y} \\ \lambda_{7y} \\ \lambda_{8y} \end{pmatrix} \quad (1017)$$

where $\lambda_{iy}$ is the value of the flow generated by the source i, i varying from 1 to 8.

If the following is set:

$$Tr = \begin{pmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{pmatrix}$$

the matrix of dimensions, the total number of segments ntr, four for example, multiplied by the total number of sources ns, eight in the example, $$\lambda = \begin{pmatrix} \lambda_1 \\ \lambda_2 \\ \lambda_3 \\ \lambda_4 \\ \lambda_5 \\ \lambda_6 \\ \lambda_7 \\ \lambda_8 \end{pmatrix}$$

the vector of the values of the sources the size of which is the number of sources ns and $$F = \begin{pmatrix} F_{t1,y} \\ F_{t2,y} \\ F_{t3,y} \\ F_{t4,y} \end{pmatrix}$$

the vector of the displaced flows of size ntr, then it is possible to generalize the equation (1017) in this way:

$$(F)_{ntr} = (Tr)_{ntrxns} * (\lambda)_{ns} \quad (1018)$$

In the case where there is also yawing, then it is necessary to take account of the volumes displaced in the y and z directions.

In this case, the equation (1018) is written $$\begin{pmatrix} F_y \\ F_z \end{pmatrix}_{ntry+ntrz} = \begin{pmatrix} Try & 0 \\ 0 & Trz \end{pmatrix}_{(ntry+ntrz) \times (2ns)} * \begin{pmatrix} \lambda_y \\ \lambda_z \end{pmatrix}_{2ns} \quad (1019)$$

A global system bringing together the equations (1002) and (1018) can be written:

$$\begin{pmatrix} CL \\ F_y \\ F_z \end{pmatrix}_{ntry+ntrz+ns} = \begin{pmatrix} My & Mz \\ Try & 0 \\ 0 & Trz \end{pmatrix}_{(ntry+ntrz+ns).2ns} * \begin{pmatrix} \lambda_y \\ \lambda_z \end{pmatrix}_{2ns} \quad (1020)$$

To resolve the system (1020), in order to find the values of the vector (λ), the matrix $$\begin{pmatrix} M \\ Tr \end{pmatrix} \begin{pmatrix} My & Mz \\ Try & 0 \\ 0 & Trz \end{pmatrix}$$

not being square, it is possible for example to use the least squares or pseudo-inverse method.

The fifth step 25 can be modelled by the following system:

$$\begin{pmatrix} 0 \\ 0 \end{pmatrix}_{ntry+ntrz} = \begin{pmatrix} Try & -\Delta y & 0 \\ Trz & 0 & -\Delta z \end{pmatrix}_{(ntry+ntr)*3ns} * \begin{pmatrix} \lambda_x \\ \lambda_y \\ \lambda_z \end{pmatrix}_{3ns} \quad (1021)$$

where Δy is the divergence of the sum of the flows along y.

In a manner equivalent to the resolution in five successive steps, it is possible to generate a global system, with a set of four sources per test point, i.e. one scalar source and three rotational sources, and by grouping together the equations (1002), (1020) and (1021) in a single step which can be written:

$$\begin{pmatrix} CL \\ F_y \\ F_z \\ 0 \\ 0 \end{pmatrix}_{4ns+2ntry+2ntrz} = \begin{pmatrix} Ms & M_{Rx} & M_{Ry} & M_{Rz} \\ 0 & 0 & Try & 0 \\ 0 & 0 & 0 & Trz \\ 0 & Try & -\Delta y & 0 \\ 0 & Trz & 0 & -\Delta z \end{pmatrix} * \begin{pmatrix} \lambda_s \\ \lambda_x \\ \lambda_y \\ \lambda_z \end{pmatrix}_{4ns} \quad (1022)$$

The matrix $$\begin{pmatrix} Ms & M_{Rx} & M_{Ry} & M_{Rz} \\ 0 & 0 & Try & 0 \\ 0 & 0 & 0 & Trz \\ 0 & Try & -\Delta y & 0 \\ 0 & Trz & 0 & -\Delta z \end{pmatrix}$$

of dimensions (4ns+2ntry+2ntrz)*4 ns not being square, the resolution is done by the least squares or pseudo-inverse method.

Finally, in order to obtain the wind at any point $P_{spa}$ of the space outside the structure, it is possible to create the matrices, or line vectors, corresponding to each of the steps of the method according to the invention, which is multiplied by the values of the sources found at each step st, then the sum is calculated.

A line vector of a step corresponds to the expression:

$$V(P_{spa}) = \sum_{i=1}^{ns} G(P_{spa}, S_i) * \lambda_i = M * \lambda \quad (1023)$$

where $$V(P_{spa}) = V1(P_{spa}) + M_{st22}(P_{spa}) * (\lambda_{st22}) + M_{st23}(P_{spa}) * \quad (1024)$$
$$(\lambda_{st23}) + M_{st24}(P_{spa}) * (\lambda_{st24}) + M_{st25}(P_{spa}) * (\lambda_{st25})$$

Figure 15:
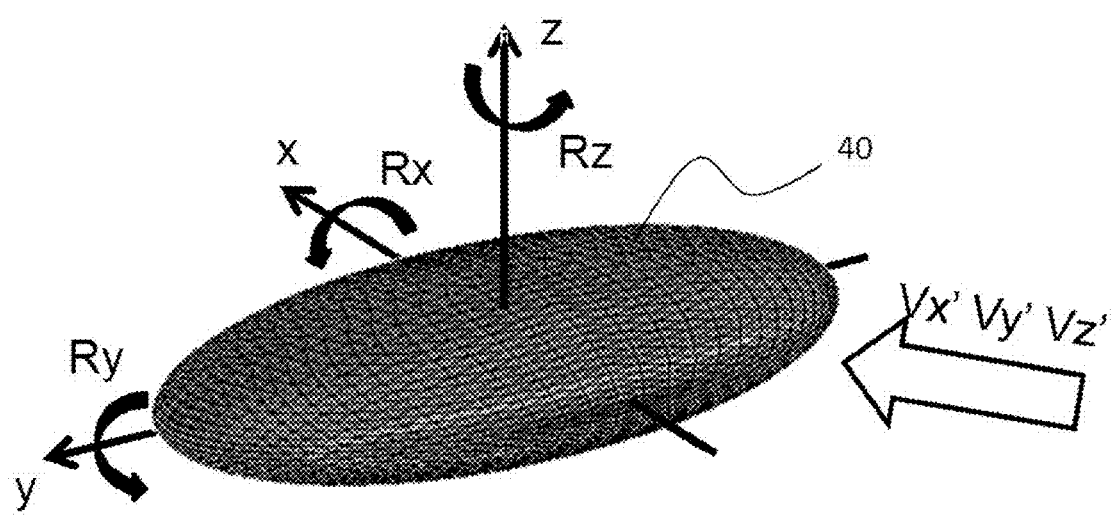
FIG. 15 represents a meshed structure, placed in a flow.

FIG. 15 shows any, meshed, structure 40, placed in a velocity flow $\vec{V}$ of components ($V_x$, $V_y$, $V_z$) expressed in an orthonormal coordinate system called aerodynamic orthonormal coordinate system i.e. a coordinate system which is not associated with the orthonormal coordinate system (o, x, y, z) of the structure 40. The aerodynamic coordinate systems and the coordinate system for the structure differ by an angle of incidence α and a yaw angle β. The forces applied $\overrightarrow{Force}$ to this structure can be expressed according to a vector $\vec{R}$ composed of the following rotational sources $R_x$, $R_y$, $R_z$:

$$\overrightarrow{Force} = \vec{V} \wedge \vec{R} = \begin{pmatrix} V_{x'} \\ V_{y'} \\ V_{z'} \end{pmatrix} \wedge \begin{pmatrix} R_x \\ R_y \\ R_z \end{pmatrix} \quad (1025)$$

For example, a lift force $\vec{F_p}$ applicable to an aircraft can be calculated in this way:

$$\vec{F_p} = \vec{V} \wedge \vec{R} = \begin{pmatrix} 0 & -V_{z'} & +V_{y'} \\ +V_{z'} & 0 & -V_{x'} \\ -V_{y'} & +V_{x'} & 0 \end{pmatrix} \begin{pmatrix} R_x \\ R_y \\ R_z \end{pmatrix} \quad (1026)$$

A drag force $\vec{F_t}$ applicable to an aircraft can be calculated as a function of the scalar sources if the mean of the latter is not zero:

$$\vec{F_t} = \vec{V} \cdot S = \begin{pmatrix} V_{x'} & 0 & 0 \\ 0 & V_{y'} & 0 \\ 0 & 0 & V_{z'} \end{pmatrix} \begin{pmatrix} S \\ S \\ S \end{pmatrix} \quad (1027)$$

Figure 16:
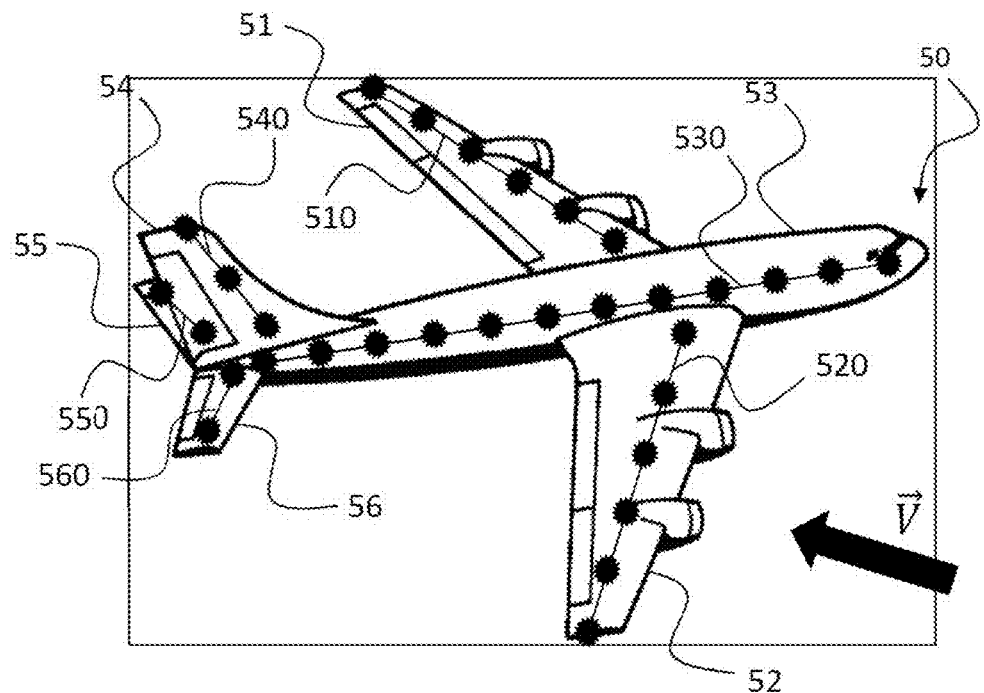
FIG. 16 represents an example of a complex structure: an aircraft.

FIG. 16 shows a complex structure: an aeroplane 50 subjected to a wind $\vec{V}$. The aeroplane is modelled by several sets of macroscopic sources. By "macroscopic source" is meant here a set of sources 5 composed of one scalar source 6 and three vector sources 7, 8, 9 as shown in FIG. 1.

The aircraft 50 is firstly cut into several structures, for example: a first wing 51, a second wing 52, a fuselage 53, a rudder unit 54, a first tail unit 55, a second tail unit 56. Each structure is modelled respectively by a set of macroscopic sources 510, 520, 530, 540, 550, 560. Each set of macroscopic sources of a structure comprises the mean values of the sources per segment of said structure.

The different steps of the method according to the invention are applied to each structure of the aircraft and the sets of flow vectors obtained are added together, in order to show the field of flow vectors around the aircraft 50.

For each structure, it is possible to define a triplet of vortices or vector sources $\vec{R_x}$, $\vec{R_y}$, $\vec{R_z}$.

If the aeroplane has an angle of incidence α, then this angle will have an impact on the calculation of $\Delta H_z$ and thus on the value of the source $R_x$ if the component $V_{x'}$ is not zero.

If the aeroplane has a yaw angle β, then this angle will have an impact on the calculation of $\Delta H_y$ and thus on the value of the source $R_z$ if $V_{x'}$ is not zero.

In a particularly advantageous embodiment, following the fifth step 25 of the method 20 according to the invention, it is possible to once again implement the second step 22 of the method 20 according to the invention, in order to impose the nullity of the components of the vectors characteristic of the flow normal to the surface of the wing 30 as boundary conditions. Following the implementation of the second step 22 again, the following step of the method according to the alternative embodiment can be the sixth step 26 of combining the calculations previously carried out.

To this end, it is possible to attribute a surface density of sources oi to each elementary surface, such that:

$$\sigma i = \rho.(dVi/dt)/dSi = \lambda i/dSi \text{ unit: } Kg/s/m^2 \quad (1028)$$

The point source placed under the surface is then interpreted as a simplification which consists of "condensing" this surface distribution into a single source point, which is compatible with the DPSM:

$$\lambda i = \sigma i.dSi = \rho.(dVi/dt) \text{ unit: } Kg/s \quad (1029)$$

The result obtained up to now is found again, except that the calculation procedure can be carried out very directly and no longer requires inversion of the non-square matrix.

In fact, this makes it possible to associate the displaced flow (dVi/dt) with the velocity vector at the surface of the element. This is an application of Gauss's theorem expanded to all types of sources. A person skilled in the art knows how to integrate and combine this embodiment in the different steps described above, by adding or replacing calculation steps.

For example, a surface source density $\sigma i = \lambda i/dSi$ in which λi is a rotational source oriented along Y (λi=Ryi) will give a velocity vector tangential to the surface (Uxi):

$$Uxi = \sigma i/(2.\rho) = (dVi/dt) \text{ unit: } m/s \quad (1030)$$

Thus the velocity vectors (Recirculation) at all test points of the structure are obtained:
- either instantly, by "condensing" the surface sources to point sources,
- or by calculating these point sources as described above by inverting the corresponding square matrix (as many test points with known boundary conditions as point sources).

It is also possible to continue to cut by vertical (incidence) and horizontal (yaw) segments, in the aerodynamic coordinate system, and to calculate the total displaced volume per segment as described above, then to deduce therefrom a total surface density for this segment. The oi of the equation (1028) would be constant for all the elements of surface belonging to the segment under consideration. Then assign this surface density to each of the elementary surfaces of the segment by means of the equation (1029).

This embodiment is particularly advantageous because it no longer requires inversion of the least squares (pseudo-inverse) matrix and makes it possible to considerably speed up the calculation and to increase its accuracy.

Figure 17:
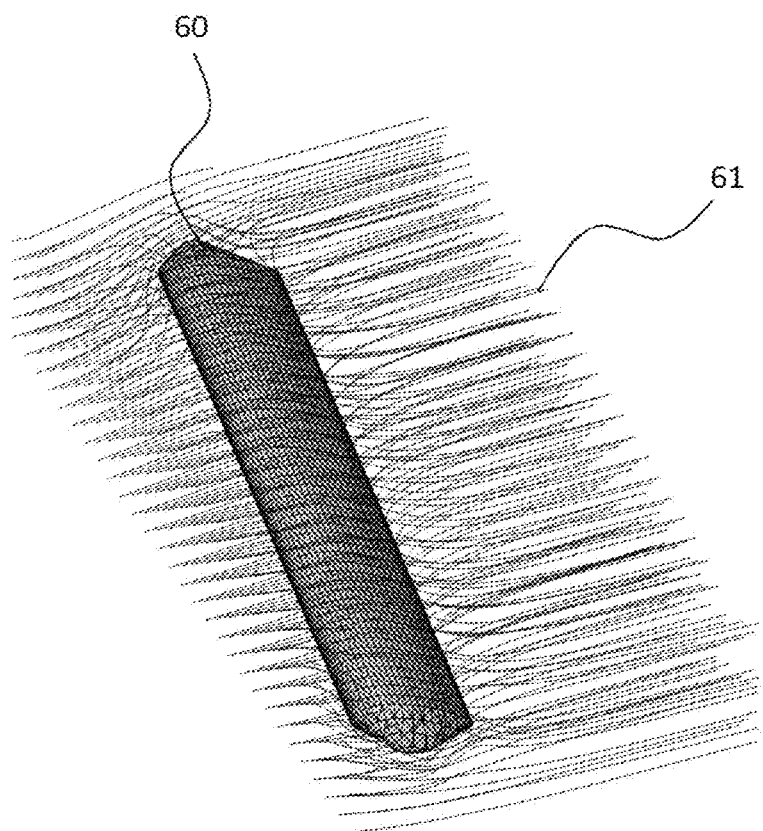
FIG. 17 represents an application of the invention to a wing at incidence and at yawing in a perspective view.

FIG. 17 shows an application of the invention to a wing 60 at incidence and at yawing in a perspective view. Thus FIG. 17 shows the streamlines 60 of the fluid simulated around the wing 60. For the example, the angle of incidence of the wing 60 is 5° and the yaw angle of the wing 60 is 10°.

Figure 18:
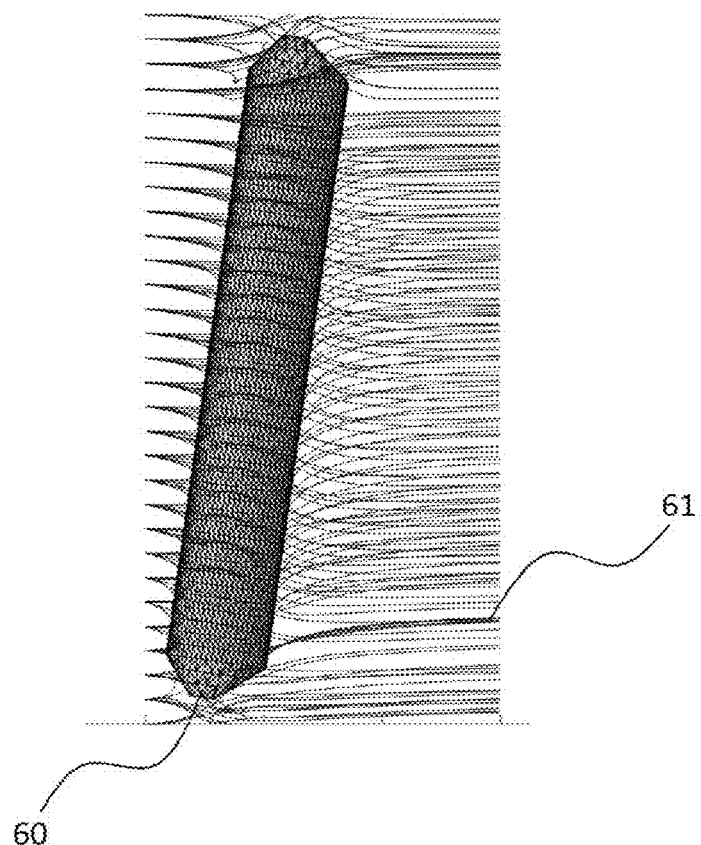
FIG. 18 represents the application of the invention to a wing at incidence and at yawing in a view from above.

FIG. 18 shows the wing 60 also represented in FIG. 17, at 5° incidence and 10° yaw, in a view from above.

One of the possible applications of the invention is its integration into a computational workflow of a simulator, for example a flight simulator.

The present invention has different advantages, including the reliability of the results obtained with respect to a real flow, the speed of the calculations not only of the forces applied to the structure by also of the flow lines for a graphic representation in the context of flow simulations.

Advantageously, the invention can be applied to other fields of fluid mechanics, for example to a modelling of the flows of air around the blades of a wind turbine, flows of water around the blades of a tidal turbine, modelling flows of water along the hull of a ship.

The invention can also be applied to the field of non-destructive testing of materials for detecting a structural fault of an object submerged for this reason in a field, the property of which is to be deformed by the presence of a structural fault situated in the object. For example there may be mentioned the field of ultrasound, electromagnetic or electrostatic fields.

The different embodiments of the present invention comprise various steps. These steps can be implemented by machine instructions that can be executed by means of a microprocessor for example.

Alternatively, these steps can be carried out by specific integrated circuits comprising a hard-wired logic, in order to execute the steps, or by any combination of programmable components and customized components.

The present invention can also be provided in the form of a computer program product which can comprise a non-transitory computer-readable recording medium containing instructions that can be executed on a data-processing machine, these instructions being capable of being used to program a computer (or any other electronic device) to execute the method.

The invention claimed is:

1. A method for simulating a flow, such that a structure is located within and surrounded by the flow, said method being implemented by computer, a behavior of said structure in the flow being modelled by radial and rotational sources generating a velocity field representing the flow around the structure, said method comprising at least the following steps:
   a first step of defining vectors characteristic of an initial flow as a function of the speed of said initial flow in an orthonormal coordinate system, in the absence of said structure in the initial flow;
   a second step of calculating a first set of flow vectors by applying Distributed Point Source Method (DPSM) technique to the radial sources and imposing the nullity of the components of the vectors characteristic of the initial flow, normal to the surface of the structure, as boundary conditions, in order to calculate the values of the radial sources;
   a third step of calculating displaced elementary volumes of the structure for each segment of said structure, said structure being cut into several segments, along each of the axes of the coordinate system, and of calculating mean values of the rotational sources along each axis of the coordinate system for the displaced elementary volumes of each segment;
   a fourth step of calculating a second set of flow vectors for each rotational source using DPSM with the nullity of the sum of the vectors of the flow tangential to said surface over the whole of a contour of each segment as boundary conditions, in order to calculate the values of the rotational sources;

a fifth step of calculating a third set of flow vectors for each rotational source using Distributed Point Source Method (DPSM) with the conservation of the vorticity of the initial flow as boundary conditions, in order to calculate the values of the rotational sources; and a sixth step of combining the vectors characteristic of the initial flow, the first set of flow vectors, the mean values of the rotational sources, the second set of flow vectors and the values of the rotational sources, in order to obtain a fourth set of flow vectors simulating the initial flow in which said structure is located, the method being implemented by a simulator for reproducing, in real time, the movement of the structure located within said initial flow.

2. The method for simulating a flow according to claim 1, characterized in that the combination of the vectors characteristic of the initial flow, the first set of flow vectors, the mean values of the rotational sources, the second set of flow vectors and the values of the rotational sources is carried out by adding together the fields of vectors obtained during each step.

3. The method for simulating a flow according to claim 1, characterized in that combining the vectors characteristic of the initial flow, the first set of flow vectors, the mean values of the rotational sources, the second set of flow vectors and the values of the rotational sources comprises constructing a vector bringing together all of the boundary conditions associated with each of the radial and rotational sources, constructing a coupling matrix between the boundary conditions and the sources bringing together the vectors characteristic of the initial flow, the first set of flow vectors, the mean values of the rotational sources, the second set of flow vectors and the values of the rotational sources in order to obtain the first, second and third sets of flow vectors as a function of the radial and rotational sources.

4. The method for simulating a flow according to claim 1, characterized in that the second step comprises a calculation, for each segment, of stagnation points of the flow vectors on the structure, said stagnation points being determined by a change of sign of vectors resulting from a cross product for each point of the contour of the segment between a flow vector on the point of the contour of the segment and a vector normal to the contour of said segment at said point of the contour.

5. The method for simulating a flow according to claim 4, characterized in that the surface area of the displaced volumes is approximated by an equivalent surface area one dimension of which corresponds to the distance between every stagnation point in the plane of the segment projected onto an axis of the segment perpendicular to the flow vectors obtained during the first step and another dimension of which is the distance travelled by the segment during the displacement of the structure.

6. The method for simulating a flow according to claim 1, characterized in that the method comprises a seventh step of calculating new stagnation points for each segment as a function of the flow vectors calculated during the sixth step, said new stagnation points being used during the second step for a new iteration of said method for simulating a flow according to claim 1, said new iteration starting from the second step of said method for simulating a flow according to claim 1.

7. The method for simulating a flow according to claim 1, characterized in that the orthonormal coordinate system is a coordinate system for the structure.

8. The method for simulating a flow according to claim 1, characterized in that the orthonormal coordinate system is a coordinate system for the flow.

9. The method for simulating a flow according to claim 8, characterized in that the method also comprises a step of determining forces applied to the structure as a function of the radial and rotational sources calculated as well as the flow vectors.

10. The method for simulating a flow according to claim 9, characterized in that the method is implemented by a flight simulator, for each elementary structure making up an aircraft.

11. The method for simulating a flow according to claim 10, characterized in that the force applied is a lift force calculated by a cross product of the flow vector deployed in matrix form and a vector composed of the rotational sources according to each of the components of the coordinate system.

12. The method for simulating a flow according to claim 9, wherein the method simulates a fluid flow, and wherein the force applied is a drag force calculated by producing a scalar product between:

a matrix, with the diagonal components thereof being composed on diagonal components of the flow vector, and a radial source vector, with each component of the radial source vector being a scalar value of the radial source.

13. The method for simulating a flow according claim 1, characterized in that the method simulates a fluid flow.

14. The method for simulating a flow according claim 1, characterized in that the flow is a wave field.

15. The method for simulating a flow according to claim 14, characterized in that the method is applied to an electromagnetic field.

16. The method for simulating a flow according to claim 14, characterized in that the method is implemented by a non-destructive testing device.

17. A non-transitory computer-readable recording medium containing instructions which, when they are executed by a computer, cause the latter to implement the steps of the method according to claim 1.

* * * * *